United States Patent
Aoyagi et al.

(10) Patent No.: US 7,924,527 B2
(45) Date of Patent: Apr. 12, 2011

(54) MAGNETIC DISK DRIVE, MAGNETIC DISK DRIVE MANUFACTURING METHOD AND METHOD OF ESTIMATING GAS AMOUNT IN MAGNETIC DISK DRIVE

(75) Inventors: Akihiko Aoyagi, Kanagawa (JP); Kazuhide Ichikawa, Kanagawa (JP); Takashi Kouno, Ibaraki (JP); Hitoshi Shindo, San Jose (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 886 days.

(21) Appl. No.: 11/899,847

(22) Filed: Sep. 7, 2007

(65) Prior Publication Data

US 2008/0068755 A1   Mar. 20, 2008

(30) Foreign Application Priority Data

Sep. 7, 2006   (JP) ................................ 2006-243469

(51) Int. Cl.
G11B 33/14 (2006.01)
G11B 25/04 (2006.01)
G01N 7/16 (2006.01)
G01N 25/18 (2006.01)

(52) U.S. Cl. ...................... 360/97.02; 73/23.2

(58) Field of Classification Search .... 360/97.02–97.04, 360/31, 75, 69, 264.7; 324/210, 212, 226; 73/23.2, 25.01, 23.25, 23.26, 865.9
See application file for complete search history.

(56) References Cited

U.S. PATENT DOCUMENTS

| | | | |
|---|---|---|---|
| 6,560,064 B1 * | 5/2003 | Hirano | 360/97.02 |
| 6,646,821 B2 * | 11/2003 | Bernett et al. | 360/31 |
| 7,808,740 B2 * | 10/2010 | Tanabe | 360/75 |
| 2003/0007280 A1 | 1/2003 | Bernett et al. | |
| 2005/0270690 A1 * | 12/2005 | Gunderson | 360/97.02 |
| 2009/0141400 A1 * | 6/2009 | Tanabe | 360/234 |

FOREIGN PATENT DOCUMENTS

| | | | |
|---|---|---|---|
| JP | 03203011 A | * | 9/1991 |
| JP | 06176557 A | * | 6/1994 |
| JP | 2000-222837 | | 8/2000 |
| JP | 2004-535647 T | | 11/2005 |

* cited by examiner

*Primary Examiner* — William J Klimowicz

(57) ABSTRACT

Embodiments of the present invention provide a magnetic disk drive that can estimate the amount of gas filled in a housing precisely and simply. According to one embodiment, a magnetic disk drive including a housing in which a magnetic disk and a magnetic head are accommodated and gas having lower density than air is filled, a heating body provided in the housing, and means for holding a reference value of a parameter representing the temperature change speed of the heating body when the heating body is heated in the housing filled with a predetermined reference amount of the gas.

20 Claims, 7 Drawing Sheets

MAGNETIC DISK DRIVE, MAGNETIC DISK DRIVE MANUFACTURING METHOD AND METHOD OF ESTIMATING GAS AMOUNT IN MAGNETIC DISK DRIVE

CROSS-REFERENCE TO RELATED APPLICATION

The instant nonprovisional patent application claims priority to Japanese Patent Application No. 2006-243469 filed Sep. 7, 2006 and which is incorporated by reference in its entirety herein for all purposes.

BACKGROUND OF THE INVENTION

The flow induced vibration of air filled in a housing in which a magnetic disk and a magnetic head are accommodated, is considered as one factor causing vibration of the magnetic disk and the magnetic head or a reading/writing error which occurs in a magnetic disk drive such as a hard disk drive device or the like.

Therefore, it has been proposed that gas (helium or the like) having lower density than air is filled in the housing of the magnetic disk drive. However, such low-density gas is more liable to leak to the outside of the housing of the magnetic disk drive as compared with air, and thus it is necessary to estimate variation of the amount of the gas in the housing.

Therefore, it has been proposed to judge the concentration variation of helium or the like filled in the housing of the magnetic disk drive on the basis of the amplitude of a reading signal, the running current of a spindle motor or the like, for example, Japanese Patent Publication No. 2004-535647 ("Patent Document 1").

However, in the above conventional technique, it is necessary to make the judgment under the state that the rotation of the spindle motor reaches a stationary state and the normal reading/writing operation of the magnetic disk is enabled, and thus there is a problem in convenience.

BRIEF SUMMARY OF THE INVENTION

An embodiment of a magnetic disk drive according to an aspect of the present invention is characterized by comprising: a housing in which a magnetic disk and a magnetic head are accommodated and gas having lower density than air is filled; a heating body provided in the housing; and holding means for holding a reference value of a parameter representing a temperature change speed of the heating member when the heating body is heated in the housing filled with a predetermined reference amount of the gas.

DETAILED DESCRIPTION OF THE INVENTION

Embodiments of the present invention relate to a magnetic disk drive, a magnetic disk drive manufacturing method, and a method of estimating gas amount in magnetic disk drive, and particularly to a magnetic disk drive filled with gas having lower density than air in a housing, a method of manufacturing the magnetic disk drive, and a method of estimating the amount of the gas in the magnetic disk drive.

Embodiments of the present invention have been implemented in view of the foregoing problem, and have as an object to provide a magnetic disk drive that can precisely and simply estimate the amount of gas filled in a housing, a method of manufacturing the magnetic disk drive and a method of estimating the amount of the gas in the magnetic disk drive.

Figure 1:
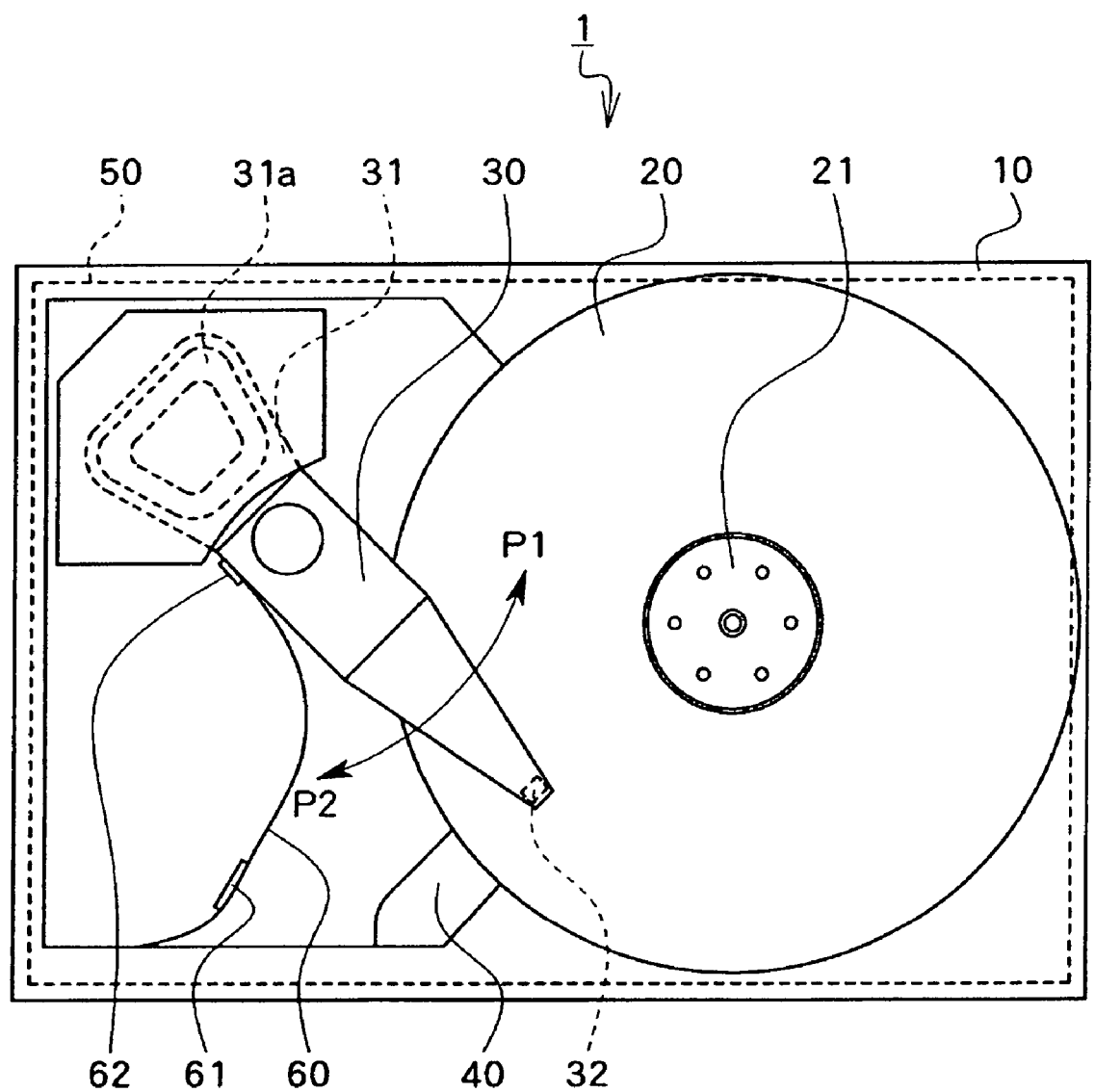
FIG. 1 is a top view showing a magnetic disk drive according to an embodiment of the invention.

A magnetic disk drive, a magnetic disk drive manufacturing method and a method of estimating a gas amount in a magnetic disk drive according to an embodiment of the invention will be described. FIG. 1 is a top view of a magnetic disk drive according to the embodiment of the invention. As shown in FIG. 1, the magnetic disk drive 1 is equipped with a box-shaped housing 10 having an opened upper portion, and a magnetic disk 20 and a head assembly 30 which are accommodated in the housing 10.

The magnetic disk 20 is rotatably supported by a spindle motor (Spindle Motor: SPM) 21, and a signal is recorded in each sector contained in a track on the surface thereof. A head assembly 30 is swingably supported by a voice coil motor (Voice Coil Motor: VCM) 31, and the tip portion thereof is equipped with a magnetic head 32 for writing/reading a signal into/from the magnetic disk 20.

VCM 31 has a VCM coil 31a for generating magnetic field by current flow therein, and a VCM magnet (not shown) formed of rare-earth magnet or the like. When current is made to flow in one direction of the VCM coil 31a (hereinafter referred to "forward direction") of the VCM coil 31a under the magnetic field occurring in the VCM magnet, driving force for swinging the head assembly 30 in the inward direction P1 of the magnetic disk 20 (the direction P1 to the center side of the magnetic disk 20 as indicated by one head of an arrow in FIG. 1) is generated, and the magnetic head 32 moves in the inward direction P1 in connection with the swing motion of the head assembly 30. Furthermore, when current is made to flow in the other direction of the VCM coil 31a (hereinafter referred to as "opposite direction") under the magnetic field generated by the VCM magnet, driving force for swinging the head assembly 30 in the outward direction P2 of the magnetic disk 20 (the direction P2 to the outer peripheral side of the magnetic disk 20 indicated by the other head of the arrow in FIG. 1) is generated, and the magnetic head 32 is moved in the outward direction P2 in connection with the swing motion of the head assembly 30.

In the housing 10 is provided a ramp 40 at which the magnetic head 32 is retracted when it moves from the upper side of the magnetic disk 20 to the outside of the magnetic disk 20. For example, when the signal writing or reading operation on a magnetic disk 20 is finished under the state that the magnetic head 32 is disposed above the magnetic disk 20 as shown in FIG. 1 (hereinafter referred to as "load state"), the magnetic head 32 is moved in the outward direction P2 by making current flow in the opposite direction of the VCM coil 31a, thereby making the magnetic head 32 stand by at the position of the ramp 40. Furthermore, for example when the signal writing or reading operation on the magnetic disk 20 is started under the state that the magnetic head 32 is retracted at the position of the ramp 40 (hereinafter referred to as "unload state"), the magnetic head 32 is moved in the inward direction P1 by making current flow in the forward direction of the VCM coil 31a and floated above the magnetic disk 20 as shown in FIG. 1.

The writing of a signal into the magnetic disk 20 is carried out by first disposing the magnetic head 32 on a track containing a sector at which the signal concerned should be written on the surface of the magnetic disk 20, and then generating magnetic field in the magnetic head 32 at the timing corresponding to the rotation of the magnetic disk 20 to magnetize the sector concerned. The reading of a signal written in the magnetic disk 20 is carried out by first disposing the magnetic head 32 on a track containing a sector at which the signal concerned is written on the surface of the magnetic disk 20, and then detecting the magnetic field generated at the sector concerned at the timing corresponding to the rotation of the magnetic disk 20 by the magnetic head concerned.

A circuit board 50 is provided on the back surface of the housing 10. The circuit board 50 is equipped with a motor driver for controlling the driving of SPM 21 and VCM 31, a hard disk controller (Hard Disk Controller: HDC) for executing the processing on data transmission/reception to/from a host computer (not shown) to which the magnetic disk drive 1 is connected, a read (Read)/write (Write) channel for modulating and demodulating the signal written into the magnetic disk 20 and the signal read out from the magnetic disk 20, etc., a micro processing unit (Micro Processing Unit: MPU) for executing calculation processing on the signal writing/reading into/from the magnetic disk 20, etc., a memory for holding data which are used for the processing by the MPU, etc. The MPU is implemented by a central processing unit (Central Processing Unit: CPU) or the like, and the memory is implemented by a synchronous dynamic random access memory (Synchronous Dynamic Random Access Memory: SDRAM) or the like.

The circuit board 50 and the magnetic head 32 are electrically connected to each other through a flexible cable 60. That is, a wire (not shown) whose one end is connected to the magnetic head 32 is disposed in the head assembly 30, and the other end of the wire is connected to one end of the flexible cable 60. The other end of the flexible cable 60 is connected to the circuit board 50. Furthermore, a temperature sensor 61 is provided in the neighborhood of a connection portion of the flexible cable 60 which is connected to the circuit board 50. The temperature sensor 61 can measure the temperature of gas filled in the housing 10 (that is, the temperature in the housing 10). Furthermore, an pre-amplifier 62 for executing the processing such as amplification of a signal read out by the magnetic head 32, etc. is provided in the neighborhood of the connection portion of the flexible cable 60 which is connected to the head assembly 30. The pre-amplifier 62 has a temperature sensor (not shown) for measuring the temperature of the pre-amplifier 62 itself.

A connection structure (not shown) for electrically connecting the inside and outside of the housing 10 is disposed at the bottom portion in the neighborhood of the flexible cable 60 of the housing 10. This connection structure has a base portion fitted to the bottom portion of the housing 10 and plural connection pins penetrating through the base portion, and it is soldered to the bottom portion of the housing 10. One end terminals of the connection pins of the connection structure project into the housing 10, and are electrically connected to SPM 21, the VCM coil 31a, the magnetic head 32, etc. The other ends thereof project to the outside of the housing 10 and are connected to the circuit board 50, an external power source, etc.

A first upper lid (not shown) is provided on the upper portion of the housing 10 in which the above members are disposed so that the opening of the upper portion is closed. The first upper lid is fixed to the frame portion of the housing 10 by screws or the like. Furthermore, a through hole through which the inside and the outside of the housing 10 intercommunicate with each other is formed in the first upper lid. In the manufacturing process of the magnetic disk drive 1, after air filled in the housing 10 is replaced by gas having lower density than air (hereinafter referred to as "low-density gas") through the through hole formed in the first upper lid, a second upper lid covering the through hole portion and the screw portions is covered on the first upper lid from the upper side thereof, and further the second upper lid is welded to the housing 10, thereby hermetically sealing the inside of the housing 10. Variation of the gas pressure in the housing 10 due to discharge of air, injection of low-density gas or the like can be detected by connecting a pressure sensor (not shown) to the through hole of the first upper lid. The manufacturing process of this magnetic disk drive 1 will be described in more detail later.

Here, according to the magnetic disk drive 1 of this embodiment, a heating body which is provided in the housing 10 is heated in the housing 10 filled with air, low-density gas or mixture gas of air and low-density gas, and the variation of the temperature is measured. Furthermore, the value of a parameter representing the temperature change speed of the heating body is calculated on the basis of the measured temperature. The value of this parameter is a value reflecting the difference between respective thermal conductivities inherent to air and low-density gas (that is, capability of depriving heat from the heating body, capability of cooling the heating body). This embodiment will be described by exemplifying a case where helium is used as the low-density gas and a VCM coil 31a is used as the heating body. If the VCM coil 31a is used as the heating body as described above, it is unnecessary to separately provide a heating body dedicated to the parameter measurement in the housing 10.

Figure 2:
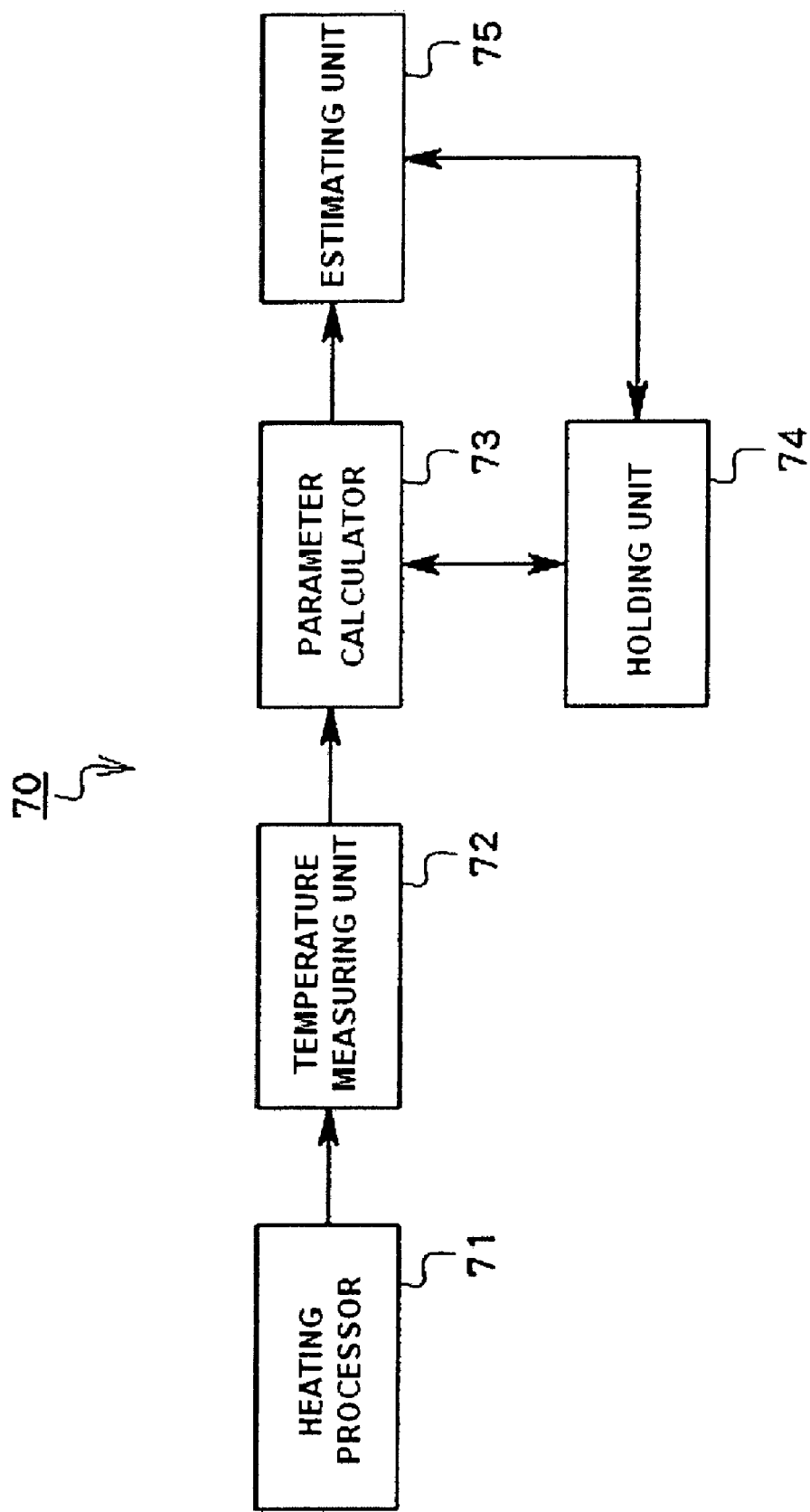
FIG. 2 is a functional block diagram showing the main processing executed by a controller of the magnetic disk drive according to an embodiment of the invention.

FIG. 2 is a functional block diagram showing the main processing executed by a controller 70 of the magnetic disk drive 1. As shown in FIG. 2, the controller 70 functionally contains a heating processor 71, a temperature measuring unit 72, a parameter calculator 73, a holding unit 74, and an estimating unit 75. The controller 70 may be implemented by MPU, HDC or the like provided to the circuit board 50 of the magnetic disk drive 1, for example. That is, the controller 70 executes the respective processing according to programs which are held in a non-volatile memory (for example, static random access memory (Static Random Access Memory: SRAM)), a flash memory (flash memory) or the like The heating processor 71 executes the processing of heating the VCM coil 31a provided in the housing 10 of the magnetic disk drive 1. That is, the heating processor 71 starts to heat the VCM coil 31a by supplying current to the VCM coil 31a without swinging the head assembly 30, and thereafter it stops the current supply to stop the heating of the VCM coil 31a.

Specifically, under an unload state that the magnetic head 32 is retracted at the position of the ramp 40 and it cannot be further moved in the outward direction P2, the heating processor 71 starts to make current flow in the opposite direction of the VCM coil 31a, whereby the VCM coil 31a is heated while the head assembly 30 is kept at the ramp 40. Furthermore, under a load state that the magnetic head 32 is disposed at the innermost position at which the magnetic head 32 cannot be further moved in the inward direction P1 above the magnetic disk 20, the heating processor 71 starts to make current flow in the forward direction of the VCM coil 31a, whereby the coil 31a is heated while the head assembly 30 is kept at the innermost position concerned. That is, the heating processor 71 executes the current supply to the VCM coil 31a with a constant voltage or constant current value for only a fixed time, whereby the VCM coil 31a can be heated under a fixed condition.

The current value which the heating processor 71 uses to heat the VCM coil 31a can be set to any value which can heat the VCM coil 31a. However, it may be set to the same value as the current value used to drive VCM 31 for swinging the head assembly 30 in the signal writing or reading operation on the normal magnetic disk 20, for example.

The timing at which the heating processor 71 starts to heat the VCM coil 31a may be set to any timing. However, it may be set to a timing at which an instruction of starting heating is received from the host computer (not shown) connected to the magnetic disk drive 1, a timing at which power is newly supplied to the magnetic disk drive 1 (that is, at the time when the magnetic disk drive 1 is started), a timing based on a predetermined schedule or the like.

The timing at which the heating of the VCM coil 31a is stopped by the heating processor 71 may be also set to any value. For example, it may be set to a timing at which a predetermined heating condition is satisfied after heating is started. That is, the condition of stopping heating may be determined in consideration of the temperature of the VCM coil 31a, the amount of heat energy supplied to the VCM coil 31a, a lapse time from the start of heating (that is, the continuing current supply time) or the like. Specifically, the heating processor 71 judges whether any one of the temperature of the VCM coil 31a, the heat energy amount supplied to the VCM coil 31a and the lapse time from the start of heating reaches a predetermined upper limit value, and stops the current supply to the VCM coil 31a when it is judged that it reaches the predetermined upper limit value. Furthermore, the heating processor 71 notifies the temperature measuring unit 72 of the timing of starting the heating of the VCM coil 31a and the timing of stopping the heating of the VCM coil 31a after the heating is started.

The temperature measuring unit 72 measures the temperature of the VCM coil 31a at the timing based on the notification accepted from the heating processor 71. That is, the temperature measuring unit 72 measures the electrical resistance value of the VCM coil 31a to calculate the temperature of the VCM coil 31a. Specifically, the temperature measuring unit 72 calculates the temperature of the VCM coil 31a on the basis of the correlation between the electrical resistance value inherent to the VCM coil 31a and the temperature in which the electrical resistance value of the VCM coil 31a is varied with the temperature, and the measured electrical resistance value of the VCM coil 31a.

Figure 3:
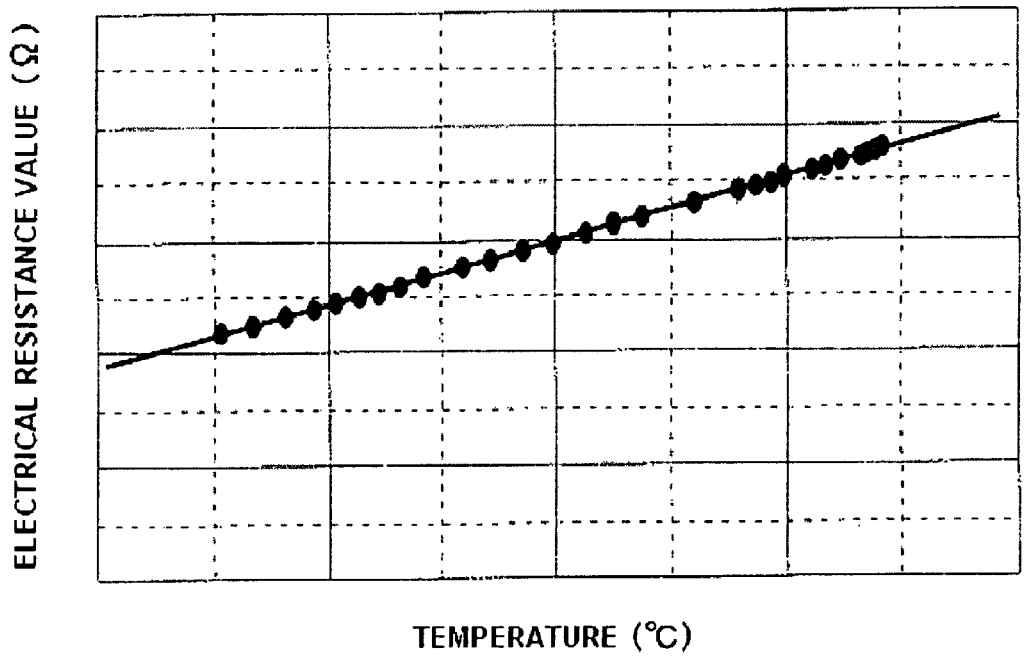
FIG. 3 is a graph showing the correlation between the temperature and the electrical resistance value of a VCM coil equipped to the magnetic disk drive according to an embodiment of the invention.

Here, FIG. 3 shows an example of the measurement result of the correlation between the electrical resistance value and the temperature of the VCM coil 31a. In FIG. 3, the abscissa axis represents the temperature (° C.) of the VCM coil 31a, the ordinate axis represents the electrical resistance value (Ω) of the VCM coil 31a, and black circles represent actually measured values. As shown in FIG. 3, the electrical resistance value of the VCM coil 31a increases in proportion to the increase of the temperature of the VCM coil 31a. Accordingly, on the basis of the electrical resistance value of the VCM coil 31a measured at each timing and the data representing the correlation between the electrical resistance value and the temperature of the VCM coil 31a as shown in FIG. 3, the temperature measuring unit 72 can calculate the temperature of the VCM coil 31a at each timing concerned. The data representing the correlation can be held beforehand held in SDRAM, SRAM, a flash memory or the like provided on the circuit board 50, for example.

Furthermore, the temperature measuring unit 72 is monitored by a VCM driver provided to the circuit board 50, for example. The electrical resistance value of the VCM coil 31a being supplied with current can be measured on the basis of the voltage and current values associated with the current supply to the VCM 31a. Furthermore, the temperature measuring unit 72 can measure the electrical resistance value of the VCM coil 31a through an electrical resistance value measuring device (tester or the like) connected to pins which correspond to some of the plural pins of the connection structure fixed to the bottom portion of the housing 10 and are electrically connected to the VCM coil 31a. When the heating processor 71 heats the VCM coil 31a without swinging the head assembly 30, the temperature measuring unit 72 can measure the temperature of the VCM coil 31a without swinging the head assembly 30.

Furthermore, the temperature measuring unit 72 measures the temperature of the VCM coil 31a at a predetermined timing during heating of the VCM coil 31a or after heating of the VCM coil 31a is stopped, for example. That is, the temperature measuring unit 72 measures the temperature of the VCM coil 31a decreasing with the time lapse after the stop of the current supply to the VCM coil 31a at plural timings which are different from one another in elapsed time from the stop of the current supply concerned, for example. Furthermore, the temperature measuring unit 72 measures the temperature of the VCM coil 31a increasing with the time lapse after the start of the current supply at plural times which are different from one another in elapsed time from the start of the current supply.

The temperature measuring unit 72 measure the temperature of the inside of the housing 10 on the basis of the notification accepted from the heating processor 71. That is, for example when the timing of stopping the heating of the VCM coil 31a is notified from the heating processor 71, the temperature measuring unit 72 measures the temperature in the housing 10 at a timing such as the timing of stopping the heating, the timing after a predetermined time elapses from the stop of the heating or the like. Furthermore, when the timing of starting the heating of the VCM coil 31a is notified from the heating processor 71, the temperature measuring unit 72 measures the temperature in the housing 10 at a timing such as a timing before the timing of starting the heating, a timing of starting the heating, a timing after a predetermined time elapses from the start of the heating or the like.

Furthermore, by using a temperature sensor 61 (see FIG. 1) provided to the flexible cable 60 in the housing 10, the temperature measuring unit 72 can measure, as the temperature of the inside of the housing 10, the temperature of gas which is filled in the housing 10 and to which the VCM coil 31a is exposed.

Furthermore, the current value flowing in the VCM coil 31a when the temperature measuring unit 72 measures the electrical resistance value of the VCM coil 31a can be set to any value with which the electrical resistance value of the VCM coil 31a can be measured, and it may be set to be smaller than the current value used to heat the VCM coil 31a by the heating processor 71. That is, when the heating processor 71 heats the VCM coil 31a with the current value used to drive VCM 31 in the normal signal writing or reading operation on the magnetic disk 20, the temperature measuring unit 72 can measure the electrical resistance value of the VCM coil 31a with the current value of 10% or less of the current value for the heating concerned. In this case, the current value for measuring the electrical resistance value is sufficiently faint, and thus the temperature increase of the VCM coil 31a due to the current supply for measuring the electrical resistance value can be neglected.

The temperature measuring unit 72 outputs the temperature of the VCM coil 31a and the measurement result of the temperature in the housing 10 to the parameter calculator 73. That is, when the temperature measuring unit 72 measures the temperature of the VCM coil 31a at plural timings after the heating is stopped, the temperature measuring unit 72 outputs to the parameter calculator 73 a measurement result indicating the association of the temperature in the housing 10 just after the heating is stopped, the temperature of the VCM coil 31a measured at each timing and the time relevant to each timing (that is, the elapsed time from the stop of the heating of the VCM coil 31a till the measurement of each electrical resistance value of the VCM coil 31a).

When the temperature of the VCM coil 31a is measured at plural timings during heating, the temperature measuring unit 72 outputs to the parameter calculator 73 a measurement result indicating the association of the temperature in the housing 10 just before the heating is started, the temperature of the VCM coil 31a measured at each timing and the time relevant to each timing (that is, the elapsed time from the start of the heating of the VCM coil 31a till each electrical resistance value of the VCM coil 31a is measured).

Furthermore, when the temperature of the VCM coil 31a is measured and at the same time the temperature in the housing 10 at the temperature measurement time is also measured, the temperature measuring unit 72 outputs to the parameter calculator 73 a measurement result indicating the association of the temperature of the VCM coil 31a measured at each timing, the time relevant to each timing and the temperature in the housing 10 at the temperature measurement time.

The parameter calculator 73 calculates the value of the parameter representing the temperature change speed of the VCM coil 31a on the basis of the measurement result accepted from the temperature measuring unit 72. That is, the parameter calculator 73 calculates the value of the parameter reflecting the heat transfer characteristic (thermal conductivity or the like) inherent to gas filled in the housing 10 on the basis of the temperature of the VCM coil 31a measured at plural timings, the time relevant to each timing and the temperature in the housing 10 just before the measurement of the temperature is started.

Specifically, the parameter calculator 73 calculates the value of the parameter representing the temperature decreasing speed of the VCM coil 31a on the basis of the measurement result of the temperature of the VCM coil 31a which decreases after heating is stopped, for example.

Figure 4:
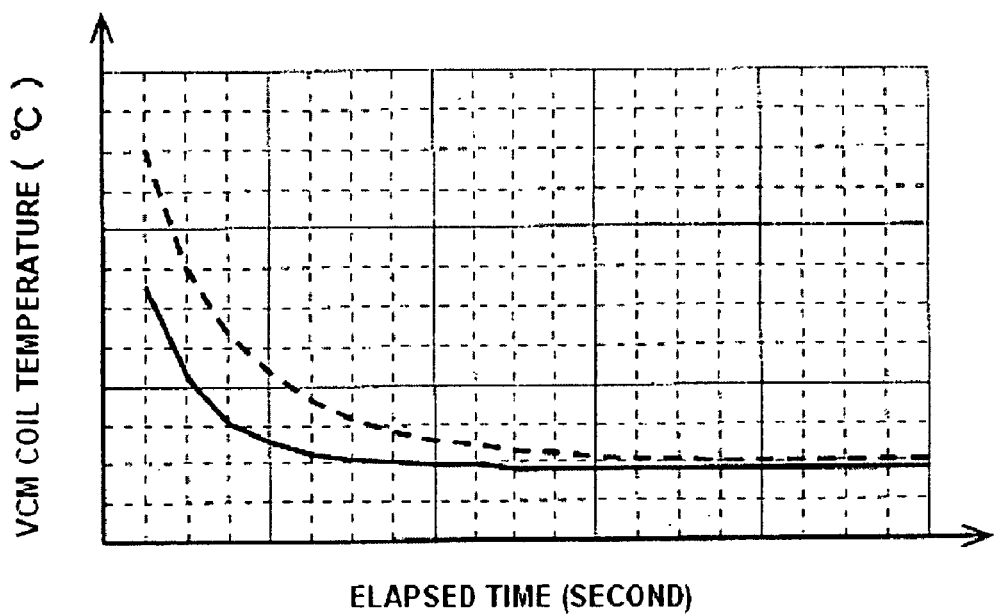
FIG. 4 is a graph showing time-lapse temperature decrease of the VCM coil cooled under the atmosphere of air or helium while SPM is driven in the magnetic disk drive according to an embodiment of the invention.

Here, FIG. 4 shows an example of the measurement result of the temperature change of the VCM coil 31a with time lapse when SPM 21 is driven in the housing filled with air or helium and the VCM coil 31a is cooled while the magnetic disk 20 is rotated. Furthermore, FIG. 5 shows an example of the temperature change of the VCM coil 31a with time lapse when the VCM coil 31a is cooled in the housing 10 filled with air or helium without driving SPM 21.

Figure 5:
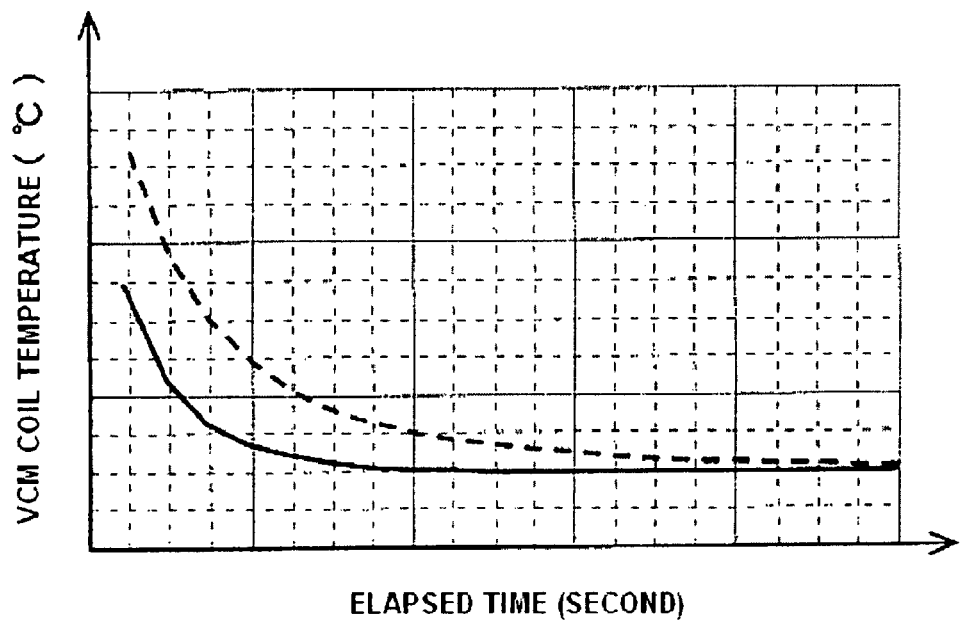
FIG. 5 is a graph showing the time-lapse temperature decrease of the VCM coil cooled under the atmosphere of air or helium without driving SPM in the magnetic disk drive according to an embodiment of the invention.

In FIGS. 4 and 5, the abscissa axis represents the time (second) elapsed from the time when the heating based on current supply to the VCM coil 31a is stopped, and the ordinate axis represents the temperature (° C.) calculated from the electrical resistance value of the VCM coil 31a at each elapsed time. A solid line indicates temperature change when helium is filled in the housing 10, and a broken line indicates temperature change when air is filled in the housing 10. As shown in FIGS. 4 and 5, the temperature of the VCM coil 31a is reduced with the time lapse after the heating based on current supply is stopped.

The parameter calculator 73 can calculate as a parameter a time constant which is calculated by using the correlation associated with such a thermal conduction phenomenon that the magnitude of the heat amount transferred from the heated VCM coil 31a to air or helium in the housing to which the VCM coil 31a is exposed is proportional to the difference between the temperature of the VCM coil 31a and the temperature of the air or the helium.

Specifically, in this case, the parameter calculator 73 calculates the time constant τ (second) representing the temperature decreasing speed or temperature increasing speed of the VCM coil 31a by using the relational expression indicated by the following equation (1). That is, as indicated in the equation (1), the parameter calculator 73 calculates the time constant τ (second) on the basis of the temperature "$T_{room}$" (° C.) in the housing 10 just after the heating of the VCM coil 31a is stopped (for example, after the heating is stopped and before the measurement of the temperature of the VCM coil 31a is started), the temperature "$T_{VCM|t=0}$" (° C.) of the VCM coil 31a at the time point when the heating of the VCM coil 31a is stopped (at the time point when the elapsed time after the stop of the heating in FIGS. 4 and 5 is equal to zero second), the time "t" (second) elapsed from the time when the heating of the VCM coil 31a is stopped, and the temperature "$T_{VCM}$" (° C.) of the VCM coil 31a after the stop of the heating at the time point of the elapsed time t second. The value of the time constant τ (second) calculated as described above is reduced as the degree of variation of the temperature "$T_{VCM}$" (° C.) of the VCM coil 31a per unit time (temperature decreasing speed or temperature increasing speed) increases. In this case, the volume of the gas filled in the housing 10 is sufficiently large, and the heat capacity of the gas is sufficiently large, so that the temperature change of the gas concerned due to heat radiation from the VCM coil 31a can be neglected. Therefore, the temperature "$T_{room}$" (° C.) in the housing 10 is regarded as being constant.

$$T_{VCM} = (T_{VCM|t=0} - T_{room})\exp(-t/\tau) + T_{room} \quad (1)$$

In this case, the time constant calculated on the basis of the temperature change of the VCM coil 31a under the atmosphere of helium is calculated as a smaller value than the time constant calculated on the basis of the temperature change of the VCM coil 31a under the atmosphere of air. That is, for example, the time constant calculated from the temperature change curve achieved under the atmosphere of helium as indicated by solid lines of FIGS. 4 and 5 is smaller than the time constant calculated from the temperature change curve achieved under the atmosphere of air as indicated by broken lines of FIGS. 4 and 5. This shows that the temperature decreasing speed of the VCM coil 31a under the atmosphere of helium is larger than that under the atmosphere of air because the thermal conductivity of helium is larger than the thermal conductivity of air (that is, the cooling capability of helium is higher than that of air).

The parameter calculator 73 calculates the value of the parameter representing the temperature increasing speed of the VCM coil 31a on the basis of the measurement result of the temperature of the VCM coil 31a which increases in connection with heating.

Figure 6:
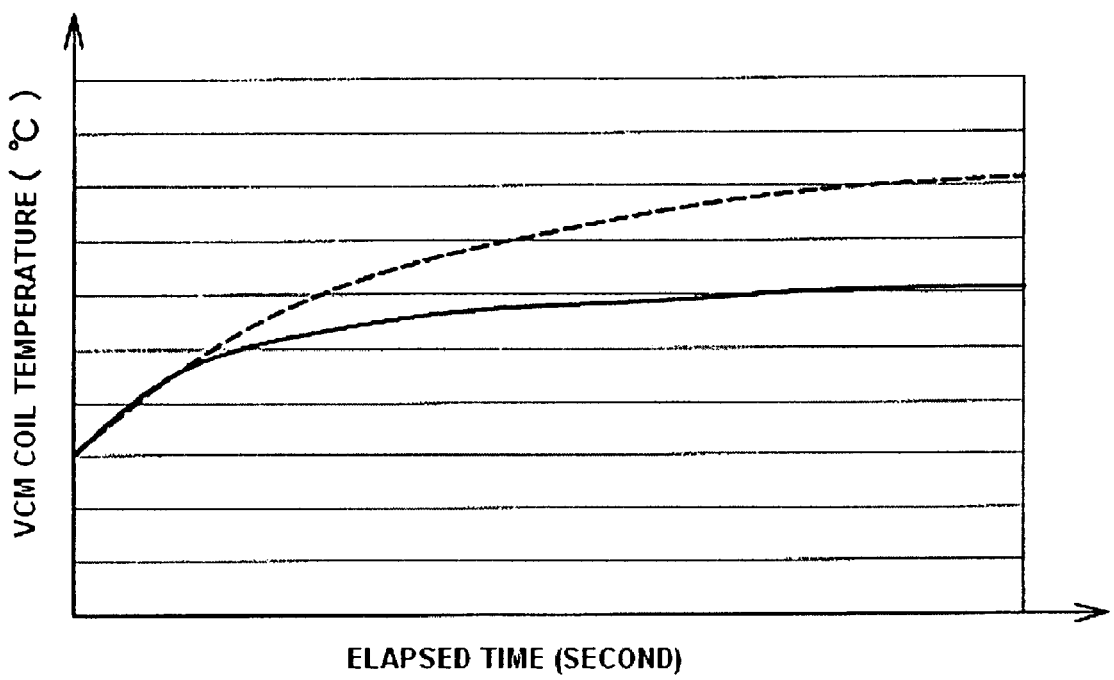
FIG. 6 is a graph showing the time-lapse temperature increase of the VCM coil heated under the atmosphere of air or helium while SPM is driven in the magnetic disk drive according to an embodiment of the invention.
Figure 7:
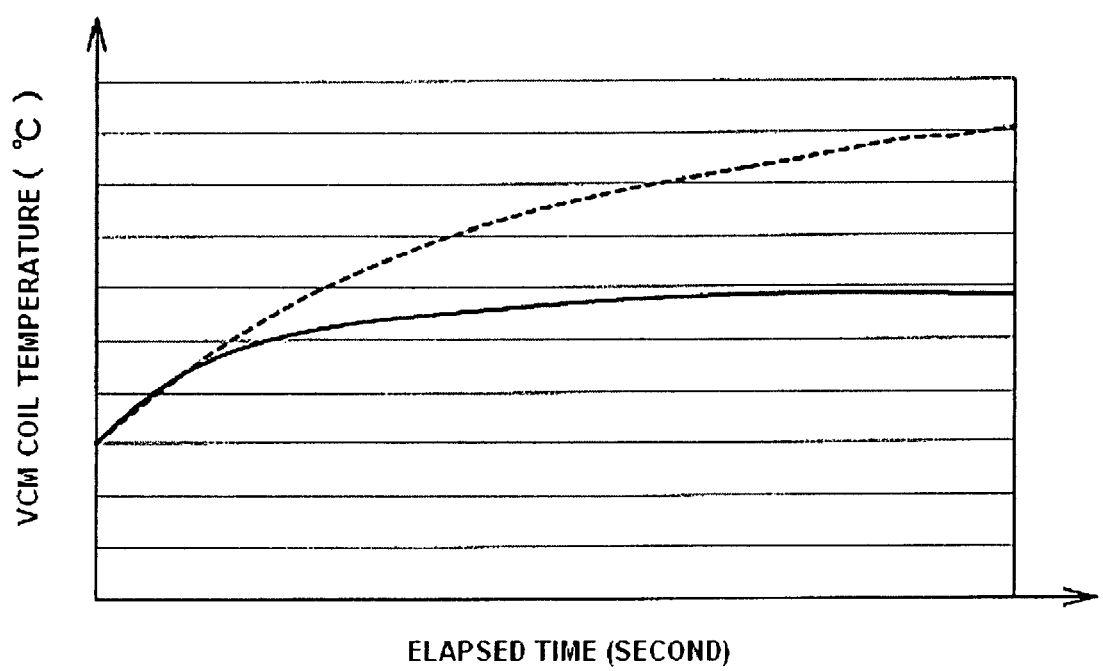
FIG. 7 is a graph showing the time-lapse temperature increase of the VCM coil heated under the atmosphere of air or helium without driving SPM in the magnetic disk drive according to an embodiment of the invention.

Here, FIG. 6 shows an example of the measurement result of the temperature change of the VCM coil 31a with time lapse when SPM 21 is driven and the VCM coil 31a is heated in the housing filled with air or helium while the magnetic disk 20 is rotated. FIG. 7 shows an example of the measurement result of the temperature change of the VCM coil 31 with time lapse when the VCM coil 3 1a is heated in the housing filled with air or helium without driving SPM 21.

In FIGS. 6 and 7, the abscissa axis represents the elapsed time (second) from the start of the heating based on the current supply to the VCM coil 31a, and the ordinate axis represents the temperature (° C.) calculated from the electric resistance value of the VCM coil 31a at each elapsed time. Solid lines indicates the temperature change when helium is filled in the housing 10, and broken lines indicates the temperature change when air is filled in the housing 10. As shown in FIGS. 6 and 7, the temperature of the VCM coil 31a increases with the time lapse after the heating based on current supply is started.

The parameter calculating unit 73 calculates the time constant τ (second) representing the temperature increasing speed of the VCM coil 31a on the basis of the temperature "$T_{room}$" (° C.) in the housing 10 just before the heating of the VCM coil 31a is started, the temperature "$T_{VCM|t=0}$" (° C.) of the VCM coil 31a at the time point when the heating of the VCM coil 31a is started (at the time point when the elapsed time after the start of the heating in FIGS. 6 and 7 is equal to zero second), the time "t" (second) elapsed from the time when the heating of the VCM coil 31a is started, and the temperature "$T_{VCM}$" (° C.) of the VCM coil 31a after the start of the heating at the time point of the elapsed time t second. The value of the time constant τ (second) calculated as described above is also reduced as the degree of variation of the temperature "$T_{VCM}$" (° C.) of the VCM coil 31a per unit time increases.

In this case, the time constant calculated on the basis of the temperature variation of the VCM coil 31 under the atmosphere of helium is calculated as a larger value than the time constant calculated on the basis of the temperature change of the VCM coil 31a under the atmosphere of air. That is, the time constant calculated from the temperature change curve achieved under the atmosphere of helium as indicated by solid lines in FIGS. 6 and 7 is larger than the time constant calculated from the temperature change curve achieved under the atmosphere of air as indicated by broken lines in FIGS. 6 and 7. This also shows that the temperature increasing speed of the VCM coil 31a under the atmosphere of helium is smaller than that under the atmosphere of helium because the thermal conductivity of helium is larger than the thermal conductivity of air.

The parameter calculator 73 which calculates the parameter values such as the time constant representing the temperature decreasing speed or temperature increasing speed of the VCM coil 31a, etc. as described above outputs the calculation result of the parameter concerned to at least one of a holding unit 74 and an estimating unit 75.

The holding unit 74 holds the calculation result of the parameter value accepted from the parameter calculating unit 73. That is, the holding unit 74 holds, in a memory such as SDRAM, SRAM, a flash memory or the like provided to the circuit board 50 or the magnetic disk 20, the calculation result associating at least two of the value of the parameter representing the temperature decreasing speed or temperature increasing speed of the VCM coil 31a, the temperature of the VCM coil 31a used to calculate the parameter value concerned, the time relevant to each timing at which the temperature is measured, the temperature in the housing 10 just before the temperature measurement is started, the type of gas (air, helium or the like) filled in the housing 10 when the temperature is measured, and the timing at which the parameter value concerned is calculated.

The holding unit 74 holds, as the parameter-value calculating timing contained in the calculation result, a specific step of the processing process of the magnetic disk drive 1 (before or after helium is filled in the housing 10 or the like), the shipping time of the magnetic disk drive 1, the elapsed time from the shipping time of the magnetic disk drive 1 till the calculation of the parameter value, the elapsed time from the start of the magnetic disk drive 1 till the calculation of the parameter value, and other elapsed times from a predetermined reference time. That is, for example, the holding unit 74 holds data representing the elapsed time from the shipping of the magnetic disk drive 1, the variation of the parameter value with time lapse which is caused by an accumulation time for which the device is operated, etc.

The estimating unit 75 compares the value of the parameter accepted as an estimation target from the parameter calculator 73 (hereinafter referred to as "estimation target value") with the value of the parameter concerned which is held in advance (hereinafter referred to as "reference value") and judges whether the comparison result satisfies a predetermined condition. That is, for example, the value of the parameter representing the temperature change speed of the VCM coil 31a when the VCM coil 31a is heated in the housing 10 filled with a predetermined reference amount of helium is held as a reference value in advance. When the value of the parameter representing the temperature change speed of the VCM coil 31a in the housing 10 filled with an unknown amount of helium is accepted as an estimation target value from the parameter calculator 73, the estimating unit 75 compares the estimation target value concerned with the reference value, and judges whether the difference between the estimation target value and the reference value is within a predetermined range or not. The reference amount of helium corresponding to this reference value concerned can be preset as the required minimum helium amount which should be filled in the housing 10 so that the signal writing and reading operations on the magnetic disk 20 by the magnetic head 32 can be normally carried out.

Furthermore, the estimating unit 75 judges on the basis of the result of the above judgment whether the amount of helium filled in the housing 10 at which the temperature of the VCM coil 31a associated with the estimation target value is measured satisfies a predetermined permissible reference. That is, for example, when a parameter whose value is reduced in connection with the decrease of the helium amount filled in the housing 10 is used, the estimating unit 75 estimates the magnitude correlation between the estimation target value and the reference value and the difference between the estimation target value concerned and the reference value concerned, and when the estimation target value is smaller than the reference value and the difference between the estimation target value and the reference value is beyond a predetermined range, the estimating unit 75 judges that the amount of helium in the housing 10 which is associated with the estimation target value concerned is lower than a permissible amount.

Furthermore, the estimating unit 75 outputs the judgment result for at least one of the parameter value and the helium amount. That is, when the comparison result between the estimation target value and the reference value does not satisfy the predetermined condition or when it is judged as the comparison result that the helium amount in the housing 10 which is associated with the estimation target amount concerned is lower than the permissible amount, the estimating unit 75 outputs a warning indicating this fact from the circuit board 50 to the outside of the magnetic disk drive 1. Specifically, when a self-diagnosis program such as SMART (Self-Monitoring Analysis and Reporting Technology) or the like for checking failure on the operation of the magnetic disk drive 1, etc. is held in the memory of the circuit board 50, the estimating unit 75 starts the program concerned, and presents the judgment result relevant to the parameter value to the user of the magnetic disk drive 1.

The estimating unit 75 makes the holding unit 74 hold the result of the above judgment. That is, the estimating unit 75 informs the holding unit 74 of the fact that the comparison result between the estimation target value and the reference value does not satisfy the predetermined condition or the fact that the helium amount in the housing 10 which is associated with the estimation target value concerned is lower than the permissible amount, and the holding unit 74 holds the informed content into the memory of the circuit board 50 or the like.

Furthermore, the reference value of the parameter to be compared with the estimation target value of the parameter by the estimating unit 75 may be set to any value which is determined in accordance with the purpose. That is, the estimating unit 75 may use as the reference value the value of the parameter representing the temperature change speed of the VCM coil 31a in the housing 10 in which air is perfectly replaced by helium and thus substantially only helium is filled. In this case, the reference value is predetermined as the arithmetic average value of parameter values calculated by using plural magnetic disk drives 1, for example.

Furthermore, the reference value under the atmosphere of helium as described above is held in advance, and also when the value of the parameter representing the temperature change speed of the VCM coil 31a in the housing 10 filled with air is accepted as a referential value from the parameter calculating unit 73 in the process of manufacturing the magnetic disk drive 1 as an estimation target, the estimating unit 75 can calculate a new reference value on the basis of the reference value concerned and the referential value concerned, and compare the calculated reference value and the estimation target value with each other. In this case, the estimating unit 75 can calculate the reference value representing the temperature change speed of the VCM coil 31a in the housing 10 filled with mixture gas containing helium and air in a predetermined ratio on the basis, for example, of the reference value achieved under the atmosphere of helium and the referential value achieved under the atmosphere of air.

Furthermore, the estimating unit 75 can use as the reference value an initial value of the parameter measured at the manufacturing time or shipping time of the magnetic disk drive 1 as an estimation target. The estimating unit 75 may read out a value which is held in advance in SDRAM, SRAM, a flash memory or the like provided to the circuit board 50 and use the value as the reference value, or may accept a value from a host computer connected to the magnetic disk drive 1 and use it.

Figure 8:
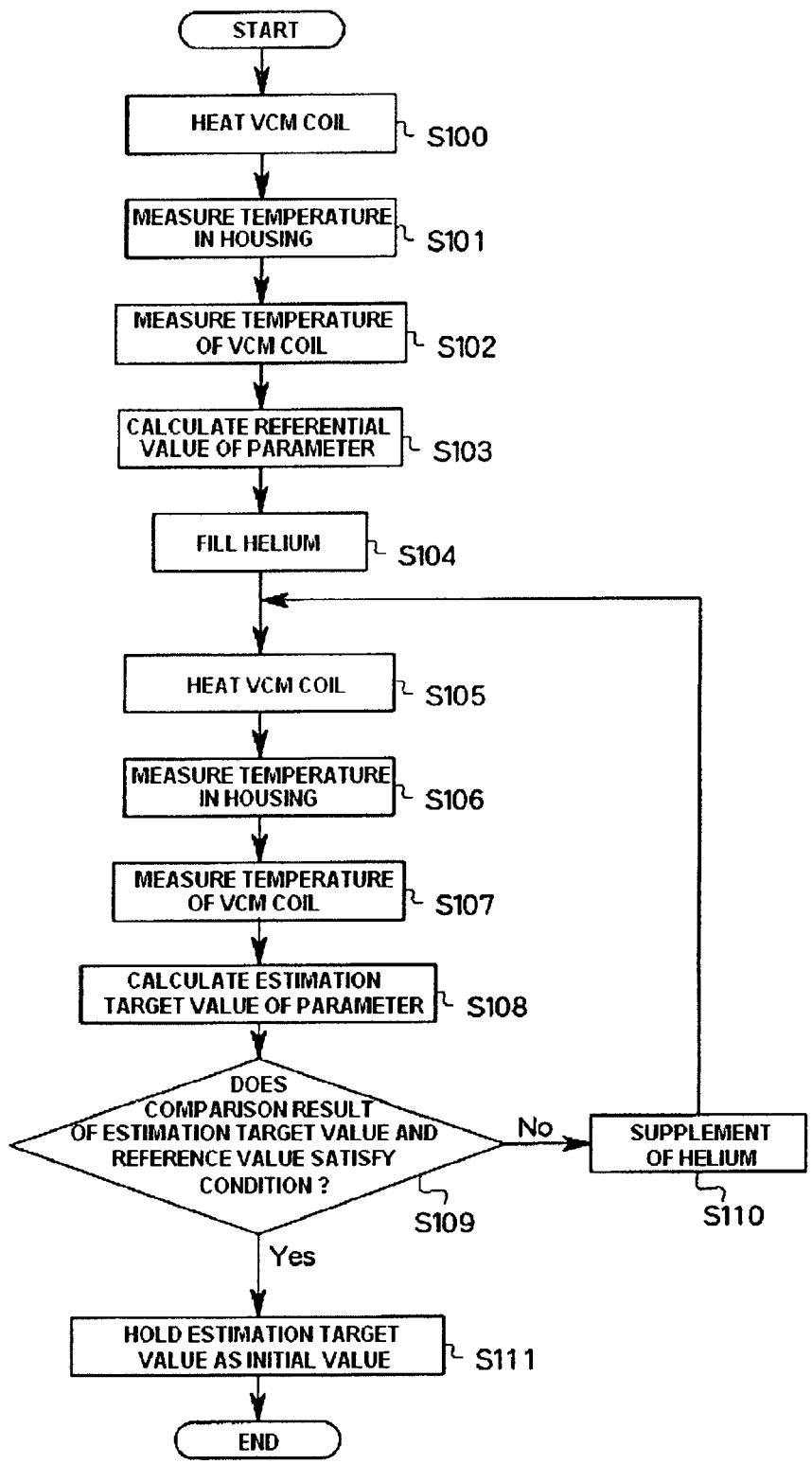
FIG. 8 is a flowchart showing the main steps contained in a magnetic disk drive manufacturing method according to an embodiment of the invention.

FIG. 8 is a flowchart showing main steps contained in the manufacturing method of the magnetic disk drive 1 according to this embodiment (hereinafter referred to as "this manufacturing method"). In this case, the description will be made by exemplifying a case where the time constant τ calculated according to the relational expression represented by the equation (1) is estimated as the parameter representing the temperature decreasing speed of the VCM coil 31a after the heating is stopped.

In this manufacturing method, first, the magnetic disk 20, the head assembly 30, the VCM coil 31a, the flexile cable 60, the circuit board 50, etc. are disposed (see FIG. 1). In the housing 10 to which the first upper lid is secured and in which air is filled, the heating processor 71 starts to supply current in the opposite direction of the VCM coil 31a under the unload state, thereby starting to heat the VM coil 31a concerned while the head assembly 30 is kept at the ramp 40, and also stops the current supply at the timing based on the predetermined condition, thereby stopping the heating of the VCM coil 31a (S100).

Furthermore, the temperature measuring unit 72 measures the temperature of the inside of the housing 10 at the timing at which the heating of the VCM coil 31a is stopped (S101). The temperature measuring unit 72 measures the electrical resistance value of the VCM coil 31a at each of the first timing at which the first time elapses after the heating of the VCM coil 31a is stopped and the second timing at which the second time elapses from the first timing, and calculates the temperature of the VCM coil 31a at the first timing and the temperature of the VCM coil 31a at the second timing on the basis of the respective measured electrical resistances and the correlation between the electrical resistance value and the temperature of the VCM coil 31a as shown in FIG. 3 (S102).

Furthermore, the parameter calculator 73 calculates the time constant representing the temperature decreasing speed of the VCM coil 31a under the atmosphere of air as a referential value on the basis of the measurement result of the temperature of the VCM coil 31a by the temperature measuring unit 72 and the relational expression shown in the equation (1) (S103), and the holding unit 74 holds the referential value under the atmosphere of air as a first referential value. The holding unit 74 holds as a second referential value the average value of time constants achieved when the VCM coil 31a is heated in the housing 10 filled with a reference value of helium by using plural magnetic disk drives 1 other than the magnetic disk drive 1 as a manufacturing target. Then, on the basis of the first referential value achieved under the atmosphere of air and the second referential value achieved under the atmosphere of the reference amount of helium, the estimating unit 75 calculates as the reference value a time constant which would be achieved when the VCM coil 31a is heated in the housing 10 filled with helium whose amount is smaller than the reference amount, but within a permissible range, and the holding unit 74 holds the calculated time constant.

Next, after the referential value is held, the air filled in the housing 10 is discharged to the outside of the housing 10, and also helium is newly injected into the housing 10, thereby filling helium into the housing 10 (S104).

As in the case of the situation that air is filled in the housing 10, the heating processor 71 starts current supply in the opposite direction of the VCM coil 31a under the unload state in the housing 10 filled with helium, thereby starting to heat the VCM coil 31a while the head assembly 30 is kept at the ramp 40, and then stops the current supply at the timing based on the predetermined condition, thereby stopping the heating of the VCM coil 31a (S105).

The temperature measuring unit 72 measures the temperature in the housing 10 at the timing at which the heating of the VCM coil 31a is stopped (S106). Furthermore, the temperature measuring unit 72 measures the electrical resistance values at the first timing at which the first time elapses after the heating of the VCM coil 31a is stopped and at the second timing at which the second time elapses from the first timing, and also calculates the temperature of the VCM coil 31a at the first timing and the temperature of the VCM coil 31a at the second timing on the basis of the respective measured electrical resistance values and the correlation between the electrical resistance value and the temperature of the VCM coil 31a as shown in FIG. 3 (S107).

Furthermore, the parameter calculator 73 calculates the time constant representing the temperature decreasing speed of the VCM coil 31a as the estimation target value on the basis of the measurement result of the temperature of the VCM coil 31a by the temperature measuring unit 72 and the relational expression shown in the equation (1) (S108).

Here, the estimating unit 75 compares the reference value calculated on the basis of the first referential value and the second referential value as described above with the estimation target value calculated by the parameter calculator 73, and judges whether the comparison result satisfies a predetermined condition, that is, the difference between the estimation target value and the reference value is within a predetermined permissible range (S109).

If the difference between the estimation target value and the reference value is within a permissible range (Yes in S109), the estimating unit 75 judges that a sufficient amount of helium is filled in the housing 10. In this case, the holding unit 74 holds this estimation target value as the initial value of the time constant at the manufacturing time of the magnetic disk drive 1 (S111), and then the processing is finished.

On the other hand, if the difference between the estimation target value and the reference value is not within the permissible range (No in S109), the estimating unit 75 judges that the amount of helium filled in the housing 10 is deficient. In this case, helium is further supplemented into the housing 10 (S1 10). Then, after helium is supplemented, the heating and the stopping of heating of the VCM coil 31a in the housing 10 (S105), the measurement of the temperature in the housing 10 after the heating is stopped (S106), the measurement of the temperature of the VCM coil 31a at plural timings (S107), and the calculation of the estimation target value of the time constant (S108) are executed. As a result, if the difference between the re-calculated estimation target value and the reference value is reduced to a value within the permissible range (Yes in S109), the holding unit 74 holds the new estimation value concerned as the initial value, and finishes the processing (S111).

As described above, according to this manufacturing method, helium is supplemented into the housing 10 until the comparison result between the estimation target value of the parameter representing the temperature change speed of the VCM coil 32a and the reference value satisfies the predetermined condition. Furthermore, in this embodiment, the heating of the VCM coil 31a and the measurement of the temperature of the VCM coil 31a are carried out without swinging the head assembly 30, and thus it is not necessarily required to drive SPM 21.

Figure 9:
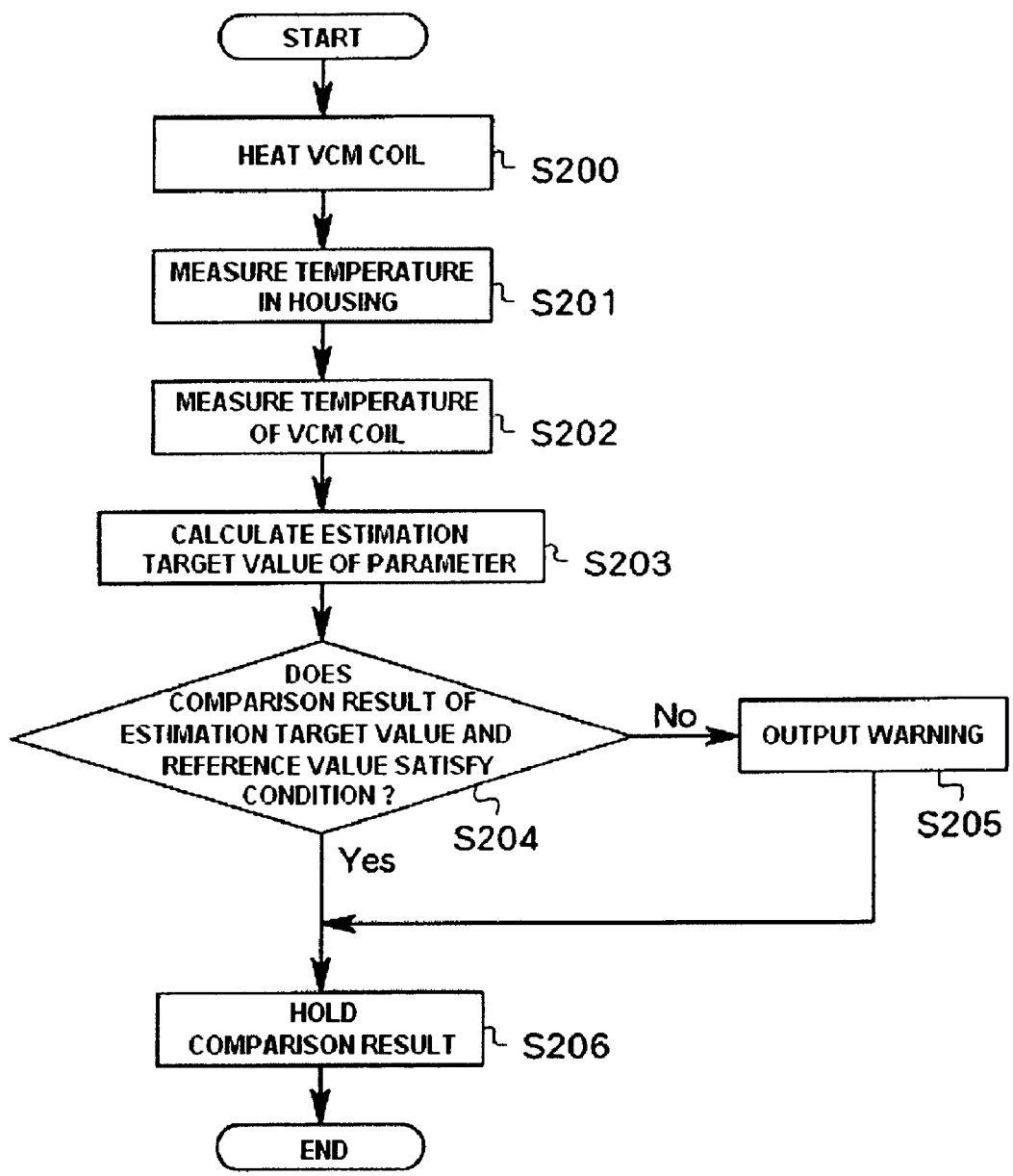
FIG. 9 is a flowchart showing the main processing contained in a method of estimating the amount of gas in a magnetic disk drive according to an embodiment of the invention.

FIG. 9 is a flowchart showing the main steps contained in a method of estimating the amount of gas in the magnetic disk drive 1 according to this embodiment (hereinafter referred to as "this estimation method"). In this case, the following description will be made by exemplifying a case where a magnetic disk drive 1 in which a sufficient amount of helium is filled in the housing 10 is once manufactured, and then it is estimated whether the amount of helium filled in the housing 10 is reduced or not.

In this estimation method, the heating processor 71 first supplies current in the opposite direction of the VCM coil 31a under the unload state, thereby starting to heat the VCM coil 31a while the head assembly 30 is kept at the ramp 40, and also stops the current supply at the timing based on a predetermined condition, thereby stopping the heating of the VCM coil 31a (S200).

The temperature measuring unit 72 measures the temperature in the housing 10 at the timing at which the heating of the VCM coil 31a is stopped (S201). Furthermore, the temperature measuring unit 72 measures the electrical resistance values of the VCM coil 31a at the first timing at which the first time elapses after the heating of the VCM coil 31a is stopped, and at the second timing at which the second time elapses after the first timing, and also calculates the temperature of the VCM coil 31a at the first timing and the temperature of the VCM coil 31a at the second timing based on each electrical resistance values measured and the correlation of the VCM coil 31a as shown FIG. 3 (S202).

Furthermore, the parameter calculator 73 calculates, as an estimation target value concerned, the time constant representing the temperature decreasing speed of the VCM coil 31a on the basis of the measurement result of the temperature of the VCM coil 31a by the temperature measuring unit 72 and the relational expression shown in the equation (1) (S203).

Here, the estimating unit 75 compares the calculated estimation target value with the reference value which is calculated on the basis of the first referential value and the second referential value in the manufacturing process as described above and held in advance, and judges whether the comparison result satisfies a predetermined condition, that is, the difference between the estimation target value and the reference value is within a predetermined permissible range (S204).

When the difference between the estimation target value and the reference value is within the permissible range (Yes in S204), the estimating unit 75 judges whether a sufficient amount of helium is still filled in the housing 10. In this case, the holding unit 74 holds this comparison result (S206), and finishes the processing. That is, the holding unit 74 holds the timing at which the estimation target value is calculated and the difference between the estimation target and the reference value in association with each other as a record of estimating the amount of helium filled in the housing 10.

On the other hand, when the difference between the estimation target value and the reference value is not within the permissible range (No in S204), the estimating unit 75 judges that the amount of helium filled in the housing 10 is lower than the lower limit amount of the permissible range on the operation of the magnetic disk drive 1, and outputs a warning indicating this fact (S205). That is, according to the self-diagnosis program such as SMART or the like, the estimating unit 75 outputs to the host computer connected to the magnetic disk drive 1 a warning indicating the fact that the helium amount in the housing 10 is insufficient, thereby presenting this fact to the user of the magnetic disk drive 1.

In this case, the holding unit 74 also holds the comparison result between the estimation target value and the reference value (S206), and finishes the processing. That is, the holding unit 74 holds the calculation timing of the estimation target value, the difference between the estimating target value and the reference value and the warning relevant to the helium amount in the housing 10 in association with one another. In this estimating method, the estimating unit 75 may use as the reference value the initial value of the time constant held in the manufacturing process, and compare the estimation target value with the initial value to estimate the amount of helium filled in the housing 10.

As described above, according to this estimation method, the amount of helium filled in the housing 10 can be estimated simply and precisely on the basis of the difference in thermal conduction characteristic between air and helium to which the heating body provided in the housing 10 is exposed.

Embodiments of the invention are not limited to the above example. That is, in the example using the above equation (1), the temperature in the housing 10 is assumed to be fixed. However, for example when the volume of gas filled in the housing 10 is relatively small and the temperature of the gas concerned is affected by heat radiation from the VCM coil 31a, the parameter value can be calculated in consideration of time-lapse temperature change of the gas concerned. In this case, the parameter calculator 73 calculates, as the parameter, the time constant τ (second) representing the temperature decreasing speed or temperature increasing speed of the VCM coil 31a by using the relational expression shown in the following equation (2).

$$T_{VCM} - T_{room} = (T_{VCM} - T_{room})|_{t=0} \exp(-t/\tau) \quad (2)$$

That is, the parameter calculator 73 calculates the time constant τ (second) on the basis of the difference "$(T_{VCM} - T_{room})|_{t=0}$" (° C.) between the temperature of the VCM coil 31a and the temperature in the housing 10 just after the heating of the VCM coil 31a is stopped (for example, the time point when the elapsed time after the stop of the heating in FIGS. 4 and 5 is equal to zero second), the time "t" (second) elapsed from the stop of the heating of the VCM coil 31a, and the difference between the temperature of the VCM coil 31a and the temperature in the housing 10 "$T_{VCM} - T_{room}$" (° C.) at the time point of the elapsed time t second. That is, in this case, the parameter calculator 73 measures the temperature of the VCM coil 31a at the timing of each elapsed time "t" (second) and at the same time it also measures the temperature in the housing 10. The thus-calculated value of the time constant τ (second) is reduced as the degree of the variation of the temperature "$T_{VCM}$" (° C.) of the VCM coil 31a per unit time (temperature decreasing speed or temperature increasing speed) increases. That is, the time constant calculated from the temperature change curve achieved at the atmosphere of helium indicated by the solid lines shown in FIGS. 4 and 5, is smaller than the time constant calculated from the temperature change curve achieved under the atmosphere of air indicated by the broken lines shown in FIGS. 4 and 5.

Furthermore, the parameter calculator 73 calculates the time constant τ (second) on the basis of the difference "$(T_{VCM} - T_{room})|_{t=0}$" (° C.) between the temperature of the VCM coil 31a and the temperature in the housing 10 at the time point when the heating of the VCM coil 31a is started (for example, the time point when the elapsed time after the heating is started in FIGS. 6 and 7 is equal to zero second), the time "t" (second) elapsed from the start of the heating of the VCM coil 31a, and the difference "$T_{VCM} - T_{room}$" (° C.) between the temperature of the VCM coil 31a and the temperature in the housing 10 at the time point of the elapsed time "t" (second). That is, in this case, the parameter calculator 73 also measures the temperature of the VCM coil 31a at the timing of each elapsed time "t" (second), and at the same time it measures the temperature in the housing 10. For example, the time constant calculated from the temperature change curve achieved under the atmosphere of helium as indicated by solid lines of FIGS. 6 and 7 is larger than the time constant calculated from the temperature change curve achieved under the atmosphere of air indicated by the broken lines shown in FIGS. 6 and 7.

Furthermore, the heating body equipped to the magnetic disk drive 1 is not limited to the VCM coil 31a and any material may be used insofar as it is disposed in the housing 10 and the temperature thereof is increased by heating. For example, a material which is directly exposed to gas filled in the housing 10 may be preferably used. Specifically, the pre-amplifier 62 (see FIG. 1), the flexible cable 60, the motor for driving SPM 21 or the like may be used as the heating body.

That is, for example, when the pre-amplifier 62 is used as the heating body, the heating processor 71 starts to make pseudo writing current flow into the pre-amplifier 62 without supplying current to the VCM coil 31a under the unload state, whereby the pre-amplifier 62 can be heated without swinging the head assembly 30 while the magnetic head 31a is kept at the ramp 40. In this case, the temperature measuring unit 72 measures the temperature of the pre-amplifier 62 increasing with time lapse in connection with current supply or decreasing with time lapse after stop of current supply at plural times by the temperature sensor provided to the pre-amplifier 62, and the parameter calculating unit 73 calculates the value of the parameter representing the temperature increasing speed or temperature decreasing speed of the pre-amplifier 62 in the housing 10 on the basis of the measurement result concerned.

Furthermore, a metal coil or the like which is separately provided in the housing 10 and generates heat by supplying current thereto may be used as the heating body. In this case, the temperature of the heating body can be directly measured by using a temperature sensor or the like which is partially brought into contact with the heating body.

What is claimed is:

1. A magnetic disk drive, characterized by comprising:
   a housing in which a magnetic disk and a magnetic head are accommodated and gas having lower density than air is filled;
   a heating body provided in the housing; and
   holding means for holding a reference value of a parameter representing a temperature change speed of the heating body when the heating body is heated in the housing filled with a predetermined reference amount of the gas.

2. The magnetic disk drive according to claim 1, wherein the gas filled in the housing is helium.

3. The magnetic disk drive according to claim 1, further comprising:
   measuring means for measuring the temperature of the heated heating body;
   calculating means for calculating an estimation target value of the parameter on the basis of the measured temperature of the heating body; and
   estimating means for comparing the estimation target value with the reference value and judging whether the comparison result satisfied a predetermined condition.

4. The magnetic disk drive according to claim 3, wherein the gas filled in the housing is helium.

5. The magnetic disk drive according to the claim 3, further comprising means for measuring the temperature of the inside of the housing, wherein the calculating means calculates the estimation target value on the basis of the measured temperature of the inside of the housing and the measured temperature of the heating body.

6. The magnetic disk drive according to claim 5, wherein the gas filled in the housing is helium.

7. The magnetic disk drive according to claim 3, wherein the measuring means measures, at plural timings, the temperature of the heating body which decreases in connection with cooling after heating or the temperature of the heating body which increases in connection with heating, and the calculating means calculates the estimation target value of the parameter representing a temperature decreasing speed or temperature increasing speed of the heating body on the basis of the temperature of the heating body measured at the plural timings.

8. The magnetic disk drive according to claim 7, wherein the gas filled in the housing is helium.

9. The magnetic disk drive according to claim 3, wherein the estimating means outputs a result of the judgment as to whether the comparison result satisfies the predetermined condition.

10. The magnetic disk drive according to claim 9, wherein the gas filled in the housing is helium.

11. The magnetic disk drive according to claim 1, further comprising means for heating the heating body without swinging a head assembly provided with the magnetic head.

12. The magnetic disk drive according to claim 11, wherein the gas filled in the housing is helium.

13. The magnetic disk drive according to claim 1, wherein the heating body is a coil for a voice coil motor for swinging a head assembly provided with the magnetic head, and the magnetic disk drive is further equipped with heating means for heating the coil by supplying current to the coil without swinging the head assembly.

14. The magnetic disk drive according to claim 13, wherein the gas filled in the housing is helium.

15. The magnetic disk drive according to claim 13, further comprising:
    measuring means for measuring the temperature of the heated coil;
    calculating means for calculating an estimation target value of the parameter on the basis of the measured temperature of the coil; and
    estimating means for comparing the estimation target value and the reference value and judging whether the comparison result satisfies a predetermined condition.

16. The magnetic disk drive according to claim 15, wherein the gas filled in the housing is helium.

17. The magnetic disk drive according to claim 15, further comprising means for measuring the temperature of the inside of the housing, wherein the calculating means calculates the estimation target value on the basis of the measured temperature of the inside of the housing and the measured temperature of the coil.

18. The magnetic disk drive according to claim 17, wherein the gas filled in the housing is helium.

19. The magnetic disk drive according to claim 15, wherein the measuring means measures, at plural timings, the temperature of the coil which decreases in connection with cooling after heating or the temperature of the coil which increases in connection with heating, and the calculating means calculates the estimation target value of the parameter representing a temperature decreasing speed or temperature increasing speed of the coil on the basis of the temperature of the coil measured at the plural timings.

20. The magnetic disk drive according to claim 19, wherein the gas filled in the housing is helium.

* * * * *

UNITED STATES PATENT AND TRADEMARK OFFICE
CERTIFICATE OF CORRECTION

| | | |
|---|---|---|
| PATENT NO. | : 7,924,527 B2 | Page 1 of 1 |
| APPLICATION NO. | : 11/899847 | |
| DATED | : April 12, 2011 | |
| INVENTOR(S) | : Aoyagi et al. | |

It is certified that error appears in the above-identified patent and that said Letters Patent is hereby corrected as shown below:

On the title page, item [75];
Inventors: Delete "Hitoshi Shindo, San Jose (JP)"
and insert -- Hitoshi Shindo, San Jose, CA (US) --

Signed and Sealed this
Twenty-fourth Day of May, 2011

David J. Kappos
*Director of the United States Patent and Trademark Office*